US012779839B2

(12) United States Patent
Carmichael

(10) Patent No.: US 12,779,839 B2
(45) Date of Patent: Nov. 3, 2026

(54) END RING FOR A SLEEVE, A SLEEVE ADAPTED TO RECEIVE SUCH AN END RING, AND A SLEEVE ASSEMBLY INCORPORATING SUCH AN END RING

(71) Applicant: Sandon Global Engraving Technology Limited, Runcorn (GB)

(72) Inventor: Gary Carmichael, Runcorn (GB)

(73) Assignee: Sandon Global Engraving Technology Limited, Runcorn (GB)

( * ) Notice: Subject to any disclaimer, the term of this patent is extended or adjusted under 35 U.S.C. 154(b) by 389 days.

(21) Appl. No.: 18/697,363

(22) PCT Filed: Oct. 25, 2022

(86) PCT No.: PCT/EP2022/079703
§ 371 (c)(1),
(2) Date: Mar. 29, 2024

(87) PCT Pub. No.: WO2023/072896
PCT Pub. Date: May 4, 2023

(65) Prior Publication Data

US 2024/0399735 A1 Dec. 5, 2024

(30) Foreign Application Priority Data

Nov. 1, 2021 (GB) .................................... 2115642

(51) Int. Cl.
*B41F 27/10* (2006.01)
*B41F 31/26* (2006.01)

(52) U.S. Cl.
CPC ............ *B41F 27/105* (2013.01); *B41F 31/26* (2013.01)

(58) Field of Classification Search
CPC ........ B41F 27/105; B41F 31/26; B41F 31/36; B41P 2200/12
See application file for complete search history.

(56) References Cited

U.S. PATENT DOCUMENTS 4,920,630 A 5/1990 Leanna
5,904,095 A 5/1999 Nelson
(Continued)

FOREIGN PATENT DOCUMENTS

DE 102005045756 A1 3/2007
EP 0791477 A2 8/1997
(Continued)

OTHER PUBLICATIONS

European Patent Office, International Seach Report in PCT/EP2022/079703, Feb. 28, 2023.

(Continued)

*Primary Examiner* — Michael C Miggins
(74) *Attorney, Agent, or Firm* — John H. Choi & Associates

(57) ABSTRACT

A sleeve assembly in which a pair of annular end rings are screwed into respective ends of an annular sleeve which includes around its inner surface a compressible liner. Respective surfaces of both end ring and sleeve are provided with specific complementary groove, chamfer, undercut or channel formations, and prior to screwing insertion of an end ring into a sleeve end, respective surfaces and formations are filled and covered with a viscous but fluent curable gasket forming composition such that amounts of gasket forming composition provided on and continuously around the end ring unite with corresponding amounts of gasket forming composition provided within and completely around corresponding surfaces of the sleeve as and when the end ring is completely screwed into a sleeve end. When the respective amounts of gasket forming composition provided on end ring and sleeve unite together and cure, effective rib or band-like rubberized seals are created.

15 Claims, 6 Drawing Sheets

(56) References Cited

U.S. PATENT DOCUMENTS

| | | | |
|---|---|---|---|
| 11,059,284 | B2 | 7/2021 | Hedges |
| 2022/0410559 | A1 | 12/2022 | Carmichael |

FOREIGN PATENT DOCUMENTS

| | | | |
|---|---|---|---|
| GB | 1261165 | A | 1/1972 |
| GB | 2544785 | A | 5/2017 |
| TW | 200911537 | A | 3/2009 |
| WO | 2014/039534 | A2 | 3/2014 |
| WO | 2015/010013 | A2 | 1/2015 |
| WO | 2017/089221 | A1 | 6/2017 |
| WO | 2021/078648 | A1 | 4/2021 |

OTHER PUBLICATIONS

European Patent Office, Written Opinion of the International Searching Authority in PCT/EP2022/079703.

END RING FOR A SLEEVE, A SLEEVE ADAPTED TO RECEIVE SUCH AN END RING, AND A SLEEVE ASSEMBLY INCORPORATING SUCH AN END RING

CROSS-REFERENCE TO RELATED APPLICATION

This application is a national stage application of International Application No. PCT/EP2022/079709 filed on Oct. 25, 2022, which claims priority to GB Application No. 2115642.7 filed on Nov. 1, 2021, which are incorporated by reference in their entireties.

FIELD OF THE INVENTION

The present invention relates to an annular end ring for an annular sleeve, an annular sleeve adapted to receive such an end ring, and an annular sleeve assembly comprising a sleeve with end rings wherein both ends of the sleeve are provided with end rings which are screwed into both ends of the sleeve. More specifically, the present invention relates to sleeve assemblies, and the end rings and sleeves of which such assemblies are primarily constituted, which are specifically adapted and designed to be used as printing or coating liquid application or transfer rolls and which therefore, in use, are inevitably and often repeatedly and sometimes forcibly exposed to aggressive operative liquids such as printing inks, varnishes, lacquers and the like. Yet more particularly, the present invention relates to sleeves and sleeve assemblies wherein a radially compressible liner is adhered or otherwise affixed to the interior cylindrical surface of the sleeve to provide the sleeve assembly with some means of being releasably mounted to, for example, an air mandrel mounted on some spindle or arbor within larger apparatus, and the end rings of the sleeve assembly provide some means whereby the ingress of the operative liquid into the end regions of said one or more liners is, in use, inhibited or precluded, at least to some degree.

The present invention relates to an annular end ring for an annular sleeve, an annular sleeve adapted to receive such an end ring, and an annular sleeve assembly comprising a sleeve with end rings wherein both ends of the sleeve are provided with end rings which are screwed into both ends of the sleeve. More specifically, the present invention relates to sleeve assemblies, and the end rings and sleeves of which such assemblies are primarily constituted, which are specifically adapted and designed to be used as printing or coating liquid application or transfer rolls and which therefore, in use, are inevitably and often repeatedly and sometimes forcibly exposed to aggressive operative liquids such as printing inks, varnishes, lacquers and the like. Yet more particularly, the present invention relates to sleeves and sleeve assemblies wherein a radially compressible liner is adhered or otherwise affixed to the interior cylindrical surface of the sleeve to provide the sleeve assembly with some means of being releasably mounted to, for example, an air mandrel mounted on some spindle or arbor within larger apparatus, and the end rings of the sleeve assembly provide some means whereby the ingress of the operative liquid into the end regions of said one or more liners is, in use, inhibited or precluded, at least to some degree.

Although the following description is provided with almost exclusive reference to the use of sleeve assemblies, and the sleeves and end rings of which such are constituted, in their most common application as Anilox rolls, the skilled reader should understand that the present invention need not be limited by application. Indeed the present invention should be considered as having application in a wide variety of different types of machinery and industries, and should not be considered as being limited only to printing or coating. For example, the end rings, sleeves, and sleeve assemblies of the present invention will be useful in any circumstance wherein there is a requirement for a sleeve assembly to be removable, exchangeable and/or replaceable, and wherein, in use, the sleeve assembly is repeatedly or persistently exposed to some operative liquid which, if its ingress into the compressible liner component of the sleeve were not inhibited or precluded, would compromise the radial compressibility characteristics of the liner, at least proximate the end regions thereof.

BACKGROUND TO THE INVENTION

In rotary printing presses, and in particular those adapted for flexographic printing, there is commonly provided what is known as an Anilox roll. The Anilox is, in general terms, a means of transferring a precise volumetric amount of ink to a flexographic printing plate in as uniform, even and (crucially) repeatable manner as possible. In order to achieve these aims, modern sleeve-based Aniloxes typically comprise an annular metal sleeve, being usually of steel or Aluminium, the outer cylindrical surface of which is coated with an industrial ceramic (Chromium (III) oxide, $Cr_2O_3$, being most common, typically deposited by plasma or high velocity oxy-fuel—HVOF—spraying) whose surface is provided with millions of microscopic cells, most commonly created by laser engraving. In order to coat the Anilox with ink or other operative liquid, the Anilox roll may be either semi-submerged in an ink fountain or in contact with a chamber doctor blade system, or it may be disposed within the press such that it is in contact with a so-called metering roller, which is semi-submerged in the ink fountain. In any case, a layer of typically viscous ink is deposited on the Anilox roll, and a doctor blade or equivalent device is used to scrape excess ink from the surface leaving just a measured amount of ink in the cells. The roll then rotates into contact with a print cylinder on which a photopolymer flexographic printing plate is mounted so that the plate receives precisely the correct quantity of ink from the cells, evenly applied, and in precisely the correct position on said plate for ultimate transfer to the print substrate material.

In the context of the present invention, sleeve-based Aniloxes are generally lightweight (e.g. less than 10-15 kg) and capable of manipulation by a single person, and as such are designed to be both easily installable in, and removable from the machines in which they are installed in use. The most common means of achieving such functionality is, on one hand, to provide what is known as an air or bridge mandrel component on the rotary spindle or arbor fixed within the printing or coating press, and on the other hand to render the interior cylindrical mounting surface of the sleeve-based Anilox radially compressible by adhering a compressible liner inside the sleeve. Thus, under normal conditions, when an operator wishes to remove an Anilox sleeve from the machine and replace it with another, he simply connects a supply of pressurised air to the bridge mandrel which results in that air being routed within the mandrel to the mounting surface on which the Anilox sleeve is mounted, which in turn causes the innermost cylindrical surface of the compressible liner provided within the Anilox sleeve to radially expand by a small amount (of the order of only 1-2 mm, possibly even less) thus releasing the sleeve from the mandrel so it can be slid axially therefrom. Likewise, when a new or different Anilox sleeve is to be mounted on the mandrel, the pressurised air radially expands the compressible liner within the sleeve so that it can be manually slid onto the mandrel. As mentioned, bridge mandrel and sleeve assemblies are already well known, as are the various different types of locking mechanisms employed to secure one to the other. In this regard, the reader's attention is drawn to, for example, U.S. Pat. Nos. 4,651,643, 4,503,769, 6,276,271.

Of particular relevance, in terms of prior art, is Applicant's own prior International application WO2017/089221A1. Within this document is described the various issues, difficulties and disadvantages of the various sleeve-based Aniloxes which existed at the date of filing of that application, most prevalent of which was the susceptibility of the compressible liner within the sleeve to become impregnated with the operative liquid (e.g. printing ink, varnish or other coating liquid).

It should be mentioned here that the requirement for the liner to be compressible means that the liner, or some constituent layer or lamina within it, must be resilient and capable of elastic deformation, and the most cost effective, suitable and widely available materials employed within existing liner constructions tend to be natural or synthetic cellular polymer foams which are sponge-like in nature and as such highly absorbent to liquids due to the extensive number of voids within their physical structure. These materials, when not otherwise protected or sealed, will simply naturally soak up liquids, and in the case of the operative liquids used in commercial printing and coating, these liquids have a tendency to congeal and solidify within the compressible foam layer of the liner. The consequences of this are that the compressibility characteristics of liner are completely compromised and it can no longer radially expand sufficiently or at all so that the liner, and the larger sleeve assembly of which it forms part, becomes effectively completely seized to the mandrel on which it is mounted.

WO2017/089221 sought to alleviate this fundamental problem by carefully designing, configuring and machining the end rings so that when the end rings are screwed completely into the sleeve ends, not only did the innermost end ring annular surface extend radially inwardly over the adjacent annular end surface of the liner so as to completely cover and conceal the annular end surface of at least the compressible layer within the liner, but also a small axial clearance (e.g. of the order of 0.5-3 mm) remained between the annular end surface of the liner and its various layers and the said innermost annular end surface of the end ring. As the skilled reader will understand, were this this axial clearance not properly closed and sealed off, it would present a relatively easy pathway for operative liquid ingress, directly into the liner and particularly the compressible layer thereof. Thus, to complete the assembly of the sleeve of WO2017/089221, a sealing gasket or gasket forming composition is applied to the annular end surface of the liner prior to screwing the end ring into place so when the end ring is ultimately and completely screwed into the end of the sleeve and its axial travel therein is complete, the gasket or gasket composition fully occupies the otherwise vacant axial clearance area betwixt liner and end ring and is slightly compressed therein, thus effectively sealing off the annular end surface of the liner. Typically, an initially fluent but ultimately curable gasket-forming composition is used, such as a curable mastic or other curable polymer composition.

While the solution to operative liquid ingress into the annular end surface of the liner proposed by WO2017/089221 proved mostly successful, the issue of fluid ingress into the compressible layer of the liner nevertheless prevails, and there continue to be instances where sleeves become seized to the bridge mandrels. In particular, Applicants herefor have discovered that while operative liquid ingress into the annular end surface of the liner from the surface of the mounting mandrel inside the sleeve assembly into the now gasket-filled axial clearance area has been significantly reduced, it still remains exceedingly difficult to completely preclude liquid ingress into the annular end surface of the liner from the outside of the sleeve assembly. Specifically, this latter mechanism of operative liquid ingress into the liner is where extant operative liquid present on the exterior annular end surfaces of both end ring and sleeve travels in the following manner:

(1) from the exposed annular end surfaces of sleeve and end ring, axially into and along the interstice between the end ring and the innermost cylindrical surface of the sleeve, (2) thence, generally axially into and through the interstice between the respectively axially threaded and tapped regions of end ring and sleeve, and then finally (3) radially inwardly into, within and along the axial clearance region between the annular end surface of the end ring and the annular end surface of the line until coming into contact with the annular end surface of the compressible layer of the liner.

This particular migration of operative liquid seemingly still occurs despite the existence of a sealing gasket or curable gasket composition predominantly or completely filling this region as mentioned above.

Applicants herefor are unsure of the exact reasons why the migration of operative liquid described in (3) above continues to occur and thus the annular end regions of liner, specifically the annular end region of the compressible layer within said liner, become impregnated, but they believe it is possible that the chemical composition of certain inks, coatings and varnishes is such that they can start to actively dissolve or otherwise deleteriously chemically interact with the gasket or gasket-forming composition which is commonly provided not only in the axial clearance area as abovementioned, but also often on the threaded and tapped regions of the end ring and sleeve respectively immediately prior to screwing the end ring into one or other end of the sleeve. It is to be mentioned that Anilox and other print and coating sleeves may endure print and coating runs lasting many hours, possibly even days, during which time the machinery will be constantly operating and the sleeves will thus be continuously rotating. As the skilled reader will appreciate these are incredibly demanding operating conditions, during which time the sleeves ends and the end rings within them will be essentially continuously exposed to the operative liquid.

In view of all the above, the present invention has as one of its primary objects the complete elimination of the ingress of operative liquid into the annular end surface of the liner by the mechanism described above, and in particular to mitigate if not completely preclude the migration and travel of the operative liquid as described in (1) and (3) above.

It is a further object of the present invention to provide some additional defence or barrier means whereby the operative liquid is prevented from migrating within and along any interstice defined between surfaces of the end ring, whether extending generally axially of the sleeve or radially, beyond said barrier or other defence.

SUMMARY OF THE INVENTION

According to the present invention there is provided a sleeve assembly as prescribed in claim 1 hereof, and further claims dependent therefrom. Specifically, a sleeve assembly is provided comprising a pair of annular end rings and an annular sleeve in each end of which said end rings are substantially disposed, said sleeve being provided internally with an annular radially compressible liner substantially symmetrically disposed within said sleeve between the end rings and being of a length such that the annular end surfaces of said liner are disposed proximate and adjacent the innermost annular end surfaces of said end rings, said liner being adhered or otherwise affixed to the interior cylindrical surface of the sleeve around its outer cylindrical surface, each of said end rings having both an exterior generally cylindrical surface which extends axially and is, in use, disposed adjacent a corresponding interior generally cylindrical, axially extending surface of said sleeve, and an inner annular end surface which extends radially and is, in use, disposed adjacent a corresponding annular and radially extending end surface of said liner, said outer cylindrical surfaces of said end rings, in first portions thereof, being provided with or functioning as connection means which interact with corresponding portions of the cylindrical surfaces of the sleeve and whereby said end rings are secured to and substantially within said sleeve at either end thereof, second portions of said outer cylindrical surfaces of said end rings being those portions thereof axially out with the first portions, Characterised in that At least one of said end rings is provided with a continuous excavation formation in at least one of:

the second portion of the outer cylindrical surface of said end ring, in which case said continuous excavation formation depends radially inwardly of the end ring, and said inner annular end surface of said end ring, in which case said excavation formation depends axially within said end ring away from said inner annular end surface thereof, And a corresponding continuous channel is provided in at least one of:

The corresponding cylindrical surface of the sleeve adjacent which the outer cylindrical surface of the end ring is, in use, disposed, and The corresponding annular end surface of the liner adjacent which, in use, the inner annular end surface of the end ring is disposed, The respective axial and/or radial dispositions of said end ring excavation formation and the corresponding continuous channel provided in one or both of the sleeve or the liner being such that, when the end ring is fully inserted within and secured to the sleeve, the excavation formation of the end ring and the respective continuous channel of the sleeve and/or liner axially and/or at least partially radially overlap whereby an amount of an initially fluent curable gasket forming composition deposited substantially within or over the end ring excavation formation can unite with a corresponding gasket or amount of gasket forming composition disposed in the corresponding continuous channel provided in the sleeve or the liner so as to form, once the initially fluent curable gasket forming composition cures, one or both of:

A continuous annular barrier seal which extends radially across the interstice defined between adjacent corresponding cylindrical surfaces of end ring and sleeve, and A continuous rib barrier seal which extends axially across the interstice defined between adjacent corresponding annular end surfaces of end ring and liner.

Preferably, the excavation formation provided on the end ring may take a variety of forms, such as a continuous channel, groove, depression, notch or the like, or possibly, in the case that the excavation feature is provided sufficiently proximate the axially innermost end annular surface of the end ring, a chamfer.

The gasket forming composition is preferably applied at least to the relevant excavation formation in such a manner that some amount of the applied gasket forming composition becomes disposed within the excavation formation. It is also preferable that the gasket forming composition is applied at least to the relevant excavation formation in such a manner that some amount of said gasket forming composition overtops said excavation formation, that is, the application is such that some amount of gasket forming composition is extant outside said excavation formation, albeit being disposed substantially radially or axially coincident therewith.

In preferred embodiments, the first portion of the outer cylindrical surface of both end rings is provided with threads, and the corresponding interior cylindrical surfaces of the sleeve, at either end thereof, are correspondingly tapped such that the end rings may be screwed into the sleeve ends and secured therein. In other embodiments, the first portion of the end ring outer cylindrical surface may function directly as the means whereby the end ring is secured to the corresponding adjacent cylindrical surface of the sleeve, for example by means of interference fit.

In some embodiments, both end rings are provided with an excavation formation in the form of a continuous channel in the second portion of their outer cylindrical surfaces, and the sleeve is provided with corresponding continuous channels at either end, internally thereof, in the corresponding cylindrical surfaces of said sleeve. In this particular arrangement, it is preferred that the first portion of the outer cylindrical surface of the end ring is disposed axially inwardly of the second portion, so that the first portion of the end ring cylindrical surface is axially more remotely disposed from the respective annular end of the sleeve assembly as a whole than the second portion. Also in this particular arrangement, the continuous channel may usefully be referred to as an undercut channel, as the channel is effectively an undercut axially behind the outwardly facing annular end surface of the end ring, which in turn provides the end ring with a radially outwardly projecting exterior lip between the annular end surface of the end ring and the said undercut channel.

Similarly, in the above embodiment, the corresponding continuous channel provided in the sleeve may also be referred to as an undercut channel, and as such would similarly provide the sleeve with a corresponding radially inwardly projecting lip. Thus where respective undercut channels are provided in end ring and sleeve, it is preferred that the radially outwardly projecting lip of the end ring has a radial dimension which is greater than that of the first portion of the cylindrical surface of said end ring such that said radially outwardly projecting lip radially overlies at least some radial portion of the sleeve. Also preferably, the radially inwardly projecting lip of the sleeve has a radial dimension which is less than the annular thickness of the sleeve such that a gasket or gasket forming composition disposed substantially within the undercut channels of end ring and sleeve and at least partially overtopping said channels can successfully unite and form the radially extending barrier seal.

In some embodiments, a radially innermost portion of the annular end surface of the sleeve is rebated radially outwardly towards the exterior cylindrical surface of the sleeve such that an annular shoulder is defined within the annular end surface of the sleeve, said annular shoulder providing a contact surface which supports, and against which abuts, a corresponding peripheral annular surface of an underside of a radially outwardly projecting lip of the end ring upon full and complete insertion of said end ring into an end of the sleeve, said annular shoulder providing a means whereby the axial travel of said end ring into and within an end of the sleeve is restricted. Of course, for this particular embodiment, the skilled reader will understand that the various axial positions and dimensions of the various components of the sleeve assembly must be carefully selected, in principle so that (1) the axially innermost annular end surface of the end ring is correctly disposed proximate and adjacent the corresponding annular end surface of the liner component adhered or otherwise affixed within the sleeve, and (2), most preferably, that the axially outermost annular end surface of the end ring either lies substantially flush with, or stands axially proud of by a small amount (typically 0.1-1.5 mm at most) the radially adjacent annular end surface of the sleeve.

Preferably the axially outermost annular end surface of the end ring, upon full and complete insertion into, and upon completion of the mechanical connection with, an end of the sleeve, stands axially proud of by a small amount (typically 0.1-1.5 mm at most) of the radially adjacent annular end surface of the sleeve, and the complete sleeve assembly is then subjected to a further machining step wherein the axially proud standing portion of the annular end surface of the end ring is ground axially downwardly such that it is rendered completely flush with the radially adjacent annular end surface of the sleeve.

Preferably, the liner is of multi-layer construction, and comprises at least three distinct layers: a first, radially innermost fabric or fibrous layer, typically having an annular thickness in the range 50-1500 microns, a second compressible layer being a natural or synthetic polymer foam, sponge, or foam-like material, typically having a thickness in the range 2-8 mm, and a third layer, being the annularly thickest of the three layers and being of a fibrous material such as coir mat, and having a typical thickness in the range 4-15 mm. Of course the skilled reader should immediately understand that these dimensions are only guidelines, and depend almost entirely on the diameter of the sleeve inside which the liner is to be adhered. In the vast majority of cases, the thicknesses of layers within liner will vary generally proportionally with the diameter of the sleeve, and the thickness ranges provided above are those which may be appropriate for a sleeve having an approximate final outer diameter of between 180-250 mm.

As the skilled reader will also understand from the foregoing, the sleeve and the liner, and especially the end rings themselves, are generally all precision engineered and exceedingly carefully dimensioned components such that the ultimate desired arrangement and disposition of the various components relative to one another is ensured. It should be mentioned here that, for both printing and coating applications, and in many other applications, it is critical that the sleeve assemblies of the present invention and the various components of which such are constituted are both perfectly cylindrical and thus perfectly balanced from a rotational inertia perspective, as well as being precisely machined to exacting dimensional specifications. Although of course it is difficult to manufacture sleeve assemblies which are truly perfect in every respect, in general, the more perfectly cylindrical and well-machined a sleeve assembly is, the more likely it is that the sleeve assembly will perform consistently and durably. When it is considered than many sleeve assemblies of the present invention are often driven at high rotational speeds over periods of many hours and sometimes even days, the requirement for precision of engineering will immediately be understood.

In some preferred embodiments, where corresponding adjacent cylindrical surfaces of end ring and sleeve are respectively provided with threads and tapped, the axial dimensions of the first and second portions of the cylindrical surfaces of the end ring (and thus its overall axial length or thickness) are important, as are the relative axial dispositions of the radially outwardly projecting lip and the first portion of cylindrical surface of the end ring on which the threads are provided. In some embodiments, a preferred arrangement is that the extent of axial travel of the end ring within the sleeve as it is rotated during screwing connection of the former to and within the latter is limited because at some point, the radial extremity of the radially outwardly projecting lip comes into abutting contact with, and thus comes to rest in and on, the annular shoulder provided in the radially inwardly projecting lip provided on the sleeve. Once the end ring assumes this position, in which it is fully connected to and essentially entirely disposed with within the sleeve, the innermost annular end surface of the end ring is automatically disposed proximate and adjacent an annular end surface of the liner adhered within the sleeve. Most preferably, and indeed in any of the various embodiments of the present invention described herein, the respective annular surfaces of both end ring and liner are ideally spaced apart by an amount not exceeding 3 mm, more preferably not exceeding 1.5 mm, and most preferably by a distance in the range 0.2 mm-1.5 mm.

There are two further dimensions that are of importance in order that the sleeve assembly as a whole may function correctly, and these are the inner diameters of the end ring and the liner respectively. Most preferably, the inner diameter of the end ring is marginally greater than the inner diameter of the liner (in its uncompressed, relaxed state, but when firmly bonded to the interior of the sleeve). By the term “marginally” is meant an amount in the range 0.2-1.8 mm, for a sleeve having an external diameter in the range 180-250 mm. Expressed in an alternative manner, the inner diameter of the end ring is preferably greater than the inner diameter of the liner by an amount in the range of 0.1-1% of the total inner diameter dimension of the end ring. For example, an end ring for a standard metal decorating sleeve may have an inner diameter of 171.54 mm, and the liner may have a corresponding inner diameter of 172.4 mm, meaning that the respective radial clearance between the inner cylindrical surface of the end ring and the inner cylindrical surface of the liner (or in other words, the exposed annular thickness of the liner) is (0.5 mm/2=250 microns).

The reason that this radial clearance is required is that the sleeve assembly as a whole must be capable of being “blown” onto an air mandrel, i.e. as described above, pressurised air is used to radially compress the liner from the inside so that the innermost cylindrical surface of the liner radially expands, allowing the sleeve assembly to be slid onto and over the mandrel. Once the sleeve assembly is in the correct axial position on the mandrel, the pressurised air is removed and the liner elastically relaxes over and around the mandrel, thus clamping the sleeve assembly as a whole thereon. Therefore, in order for this radial expansion of the liner to be possible, the end rings (which, being most preferably of steel, of course do not expand) must be radially set back from, or disposed radially outwardly (i.e. in the direction of the exterior cylindrical surface of the sleeve assembly as a whole), the innermost cylindrical surface of the liner.

In some embodiments, the excavation formation takes the form of a continuous groove which is provided in and around the innermost (of the sleeve assembly as a whole) annular end surface of one or both end rings, and the liner is provided with a corresponding continuous channel, which may be machined out or otherwise excavated from, one or both annular end surfaces thereof. In this particular embodiment, the groove may preferably have a generally hemi-circular or hemi-elliptical cross-section, or in some embodiments the groove be channel-like and may be U-shaped in cross-section. This particular embodiment of the invention, where a groove and a corresponding channel are provided in, respectively, the annular end surfaces of end ring and liner, may thus hereinafter referred to as the "groove" embodiment, but of course such language should not in any way be considered as limiting the scope of the present invention. Such language is merely used as a means of distinguishing this particular embodiment from the "undercut" embodiment described above.

In some embodiments, the excavation formation takes the form of a continuous chamfer which is provided around one or both end rings between, on the one hand, the axially innermost annular end surface thereof, and an axially innermost portion of the axially extending cylindrical surface thereof, and the sleeve is provided with a corresponding continuous channel at a suitable axial disposition inside the sleeve so that when the or those end rings are screwed fully and completely into the or those ends of the sleeve, the chamfer on the end ring(s) and continuous channel within the sleeve(s) are to some extent, if not (preferably) completely, axially coincident with one another inside the sleeve assembly as a whole. This particular embodiment of the invention, where a continuous chamfer is provided on the end ring and a corresponding continuous channel is provided in and around the interior cylindrical surface of one or both ends of the sleeve, may thus hereinafter referred to as the "chamfer" embodiment of the invention, but of course such language should not in any way be considered as limiting the scope of the present invention. Such language is merely used as a means of distinguishing this particular embodiment from the "undercut" and "groove" embodiments described above.

It should also be mentioned here that the present invention may include either any one or more of the "undercut", "groove", and "chamfer" embodiments alone or in combination. Furthermore, it is within the contemplation of the invention that one or more of such embodiments might be provided at one end of the sleeve assembly, whereas one or more alternate embodiments might be provided at the alternate end of that sleeve assembly. The skilled reader will thus immediately understand that any of a number of combinations of these embodiments may be possible, even within a single sleeve assembly.

In the most preferred arrangements, both end rings, and this both ends of the sleeve assembly according to the present invention as a whole, are provided with all three of the "undercut", "groove" and "chamfer" embodiments.

In all of the "undercut", "groove" and "chamfer" embodiments, it is nevertheless still preferred that the first portion of the exterior cylindrical surfaces of the end ring are provided with threads so that the end rings can be easily screwed into and secured within the sleeve, a portion of the interior respective cylindrical surfaces of which are of course corresponding tapped.

In the "groove" embodiment, as in the present invention more broadly, the continuous channel of the end ring, prior to insertion into and connection to the sleeve end, is substantially filled with a continuous bead of gasket forming composition in such as manner as to slightly overtop and/or overflow from said channel such that when the end ring is fully screwed into or otherwise inserted into and secured within the sleeve, the gasket forming composition is both forcibly compressed further into the continuous channel (of the liner), and may also spread or ooze laterally (or axially, in the case of the "undercut" embodiment) outside and beyond the confines of the continuous channel and/or groove.

In the "chamfer" embodiment, said chamfer of the end ring, prior to insertion into and connection to the sleeve end, is substantially covered with an amount gasket forming composition over substantially its entire surface area such that a significant portion of that gasket forming composition lies radially beyond the exterior cylindrical surface of the end ring at the end of which said chamfer is provided. Additionally, the corresponding channel within the interior cylindrical surface of the sleeve disposed an axial distance inside the sleeve corresponding, approximately, to the overall axial depth of the end ring (given that the chamfer is provided at the innermost end thereof) is also provided with either a gasket therein, or with an amount of gasket forming composition similarly applied. In this condition, when the end ring is fully screwed into or otherwise inserted into and secured within the sleeve, the gasket forming composition provided on, over and around the chamfer can easily combine and unite with the gasket or gasket forming composition provided in the continuous channel of the sleeve. Again, in the case that gasket forming composition is provided on both the chamfer and the continuous channel, there will again be some useful spreading and/or oozing, both axially and laterally outside and beyond the axial and radial confines of the continuous channel and chamfer.

Importantly, for all the various embodiments of the present invention, there is contact between that amount of gasket forming composition within the excavation formation of the end ring, and the amount of such composition, whether already cured or not, or the gasket, already present within the corresponding continuous channel provided in the liner (in the case of the "groove" embodiment) or the interior corresponding cylindrical surface of the sleeve (in the case of the "undercut" and "chamfer" embodiments).

As the skilled reader may understand, and particularly when the end ring is screwed into the sleeve end, the end ring must necessarily rotate as part of the insertion process, and therefore there will inevitably be some smearing of the gasket forming composition present within the excavation formation(s) provided on the end ring. However, both the amount gasket forming composition and the nature of its deposition within the excavation formation(s) (i.e. in slight excess, or such that the composition overtops or overflows slightly above and to the sides of the excavation formation) is such that a substantially continuous contact surface can be achieved with the pre-existing gasket or (cured) gasket forming composition already present within the continuous channel(s) of the sleeve and/or liner, even despite (or possibly even ameliorated by) the rotation of the end ring as it is inserted.

Once the End ring is fully screwed in place with the end of the sleeve and the assembly left undisturbed for a period of time, the gasket forming composition cures, and as it does so it unites with the pre-existing gasket/gasket forming composition in a substantially complete and continuous manner, thus resulting in an effectively complete annular barrier seal (extending generally radially), or an effectively complete and continuous rib barrier seal (extending generally axially), as the case may be.

In some preferred embodiments, one or both of the second portion of the exterior cylindrical surface of the end ring, and the interior annular end surface of the end ring may be provided with a further excavation formation, axially distinct and separated from any other excavation formation provided in such surface, said further excavation formation not having any corresponding further continuous channel provided in the corresponding adjacent surfaces of sleeve or liner. Although the present invention requires one of more complementarily disposed excavation formation (of the end ring) and continuous channels (of the sleeve or liner) to be provided, Applicant considers that a simple, unmatched excavation formation, such as a channel or groove, provided in the end ring, which is filled as previously described with a gasket forming composition, may still provide some additional useful sealing function with the respective surface of the sleeve and/or line once the gasket forming composition cures to form a continuous, generally circular sealing bead between either:

- the respective and adjacent annular end surfaces of the end ring and the liner, and
- the respective cylindrical surfaces of the end ring and the sleeve, the resulting (cured) gasket being essentially similar to an O-ring seal.

Most preferably, in all embodiments, in the completed sleeve assembly, any gasket or gasket forming composition substantially if not completely occupies both the excavation formation of the end ring and the continuous channel of the sleeve or liner, in which it is provided.

In the most preferred embodiments of the "groove" type, the liner component provided within the sleeve is a multi-laminar liner wherein at least one of the lamina is a compressible layer, and the continuous channel provided in the liner is substantially coincides with said compressible layer. That is, the continuous channel is formed in the annular end surface of the liner by excavating or otherwise machining out the compressible layer to a uniform depth.

In those embodiments where a further unmatched excavation formation is provided in the annular end surface of the end ring, the radial position (from the sleeve central axis) of the first "matched" excavation formation and the dimension of the opening thereof are selected such that radially, the compressible layer of the liner (and the continuous channel provided substantially within it) is disposed entirely and completely radially inwardly of the further excavation formation, which is thus more radially distant from a central axis of the sleeve assembly than said compressible layer. For this specific latter embodiment, most preferably, a radial clearance distance, for example in the range 0.2-3 mm, exists between the radially outermost extent of the compressible layer of the liner, and the radially innermost extent of the matched excavation formation provided in the annular end surface of the end ring adjacent which the corresponding annular end surface of the liner is disposed. By this arrangement, therefore, a yet further seal can be created along the possible liquid ingress path as described in the introductory portions of this specification, at (1), (2), (3) above. In particular this additional seal is provided to provide a further barrier or defence against the tendency of operative liquid to migrate radially inwardly along the interstice defined between the adjacent and proximately disposed end ring and liner annular end surfaces.

In most embodiments, a gasket forming composition is preferred over a solid (typically rubber or rubberised material) gasket. Preferably the gasket forming composition is initially viscous but fluent and can be applied manually, for example from an applicator gun similar to those used to apply conventional kitchen and bathroom sealants. As will be described below, ideal gasket forming compositions cure to provide a rubberised, elastic waterproof and chemically resistant elastomer which is continuous, and thus unitary, within the continuous channel.

In most preferred embodiments, amounts of gasket forming composition may be applied, for example by manual smearing, onto and preferably completely over any and all those exterior and interior surfaces respectively of one or both of the end ring and the sleeve which ultimately come into contact with one another, or become proximately and adjacently disposed with one another as a result of the insertion into and mechanical connection of the end ring within an and of the sleeve. In particular, one or more, or most preferably all of the following surfaces (in addition to the continuous channels and further continuous channels discussed above) are provided with a substantially continuous layer of gasket forming composition:

- the exterior cylindrical surface of the radially outwardly projecting lip of the end ring
- the interior cylindrical surface of the radially inwardly projecting lip of the sleeve
- the underside (axially inwardly disposed from the annular end surface) of the radially outwardly projecting lip of the end ring, particularly at the extremity or most peripheral region thereof,
- the annular shoulder defined in the radially inwardly projecting lip of the sleeve
- the excavation formations of the end ring and the corresponding continuous channels of the liner or sleeve, such preferably being completely filled with gasket forming composition,
- the exterior cylindrical surface, whether threaded or, in some embodiments, unthreaded, of the notional second portion of the end ring
- the corresponding interior cylindrical surface, whether tapped and provided with screw threads or not, of the sleeve with which the second portion of the end ring comes into engagement with during connection of the end ring within an end of the sleeve,
- the entire annular end surface of the end ring, and if optional further unmatched excavation formation is provided in this surface, then it is preferred that this be completely filled, and
- the annular end surface of the liner.

Preferably the gasket forming composition is a hybrid polymer such as sold by Soudal under their "Soudaseal 2K" trade name. This is only one example of a suitable gasket forming composition, and the skilled reader will immediately understand that there will be many others not explicitly mentioned herein. The particular characteristics of the "Soudaseal 2K" sealant are given as:

- fast curing, functions as both an adhesive and a sealant, elastical bonding, fast strength build-up, excellent mechanical strength properties upon becoming fully cured, permanently elastic after curing, does not contain isocyanates, silicone and/or solvents, cures without the presence of atmospheric moisture. As the skilled reader will readily understand, many other known sealants possess many if not all of these qualities, and such sealants could therefore also be capable of use with the present invention.

In further aspects of the invention, there is provided an end ring for use in a sleeve assembly as abovementioned and described, and a sleeve, and a method of manufacture of the assembly as a whole, including a sleeve with end rings provided at either end.

A specific embodiment of the invention is now described by way of example and with reference to the accompanying drawings wherein:

DETAILED DESCRIPTION

Figure 1:
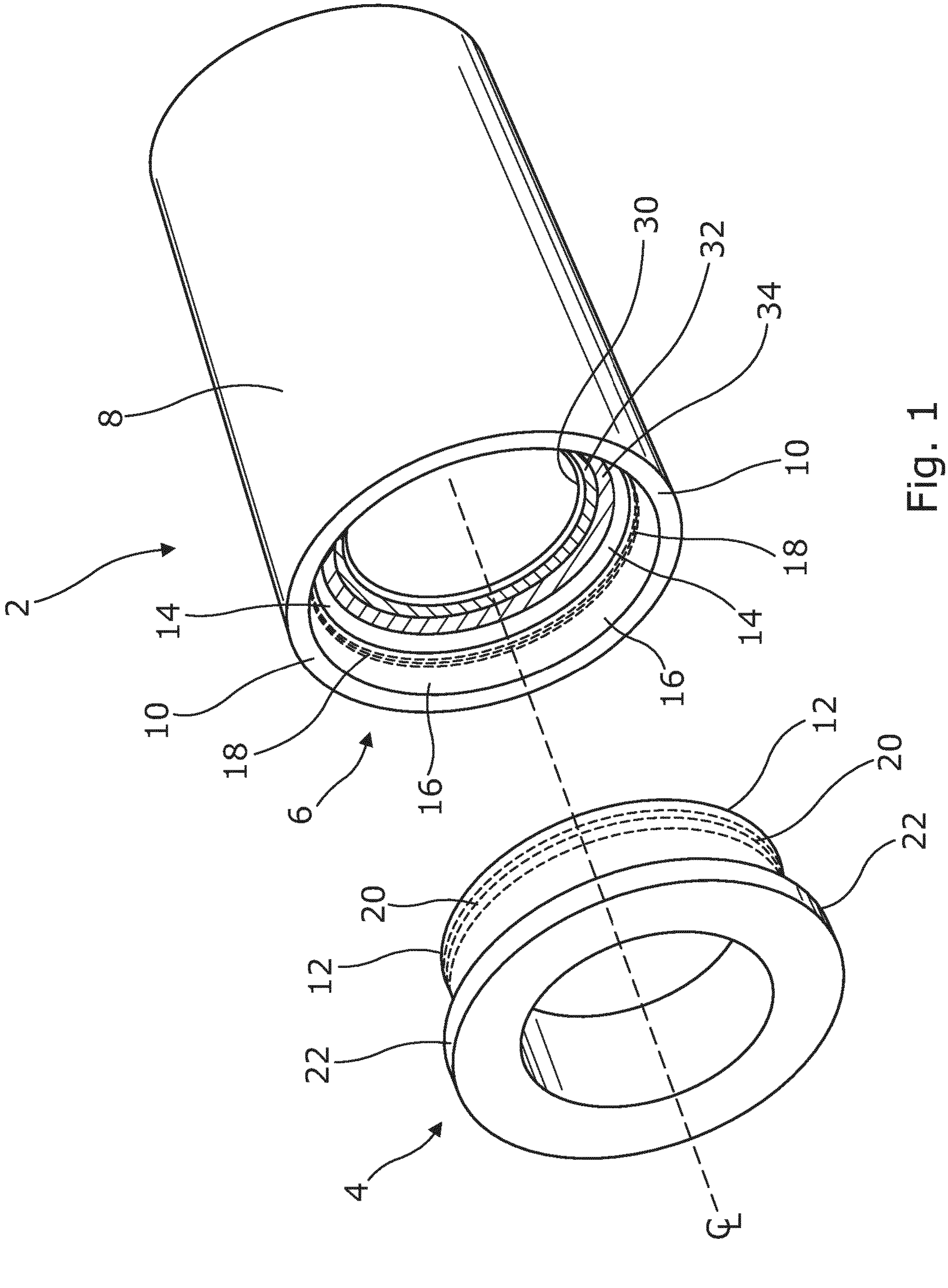
Fig. 1 (Prior Art)
FIG. 1 shows an exploded perspective view of one end of sleeve forming part of the prior art, and an end ring, also of known configuration, adapted for screwing insertion into said sleeve end.

Referring firstly to FIG. 1, there is shown an exploded perspective view of a sleeve assembly of known configuration, in which a sleeve, generally indicated at 2, and corresponding end ring 4 are illustrated. An open end 6 of the sleeve is illustrated prior to screw-fitting insertion of the end ring 4 therein. The sleeve 2 is tubular and cylindrical. The primary structural component of the sleeve itself is an annular aluminium or steel tube 8 (which in this Figure is not shown with any coating or printing plate layer yet applied or affixed to the exterior surface for clarity, but which is in practice is commonly required).

The open end 6 of the tube 8 is internally rebated so that:

- the internal diameter of the tube in the end region is enlarged as compared to the internal diameter of the tube axially beyond the depth of the rebate,
- the wall thickness of the tube in the end region is reduced as compared to the wall thickness elsewhere along the tube, and
- an internal shoulder 14 is defined in the tube at some short distance axially inside the tube (typically of the order of 5-25 mm) remote from the open end 6.

Thus, after internal rebating, an outermost radial annular surface 10 is provided which defines an opening which receives a correspondingly shaped and sized tubular shank portion 12 of the end ring 4, and axially inwardly of the open end 6, there is provided shoulder 14 which an outer portion of the end-most radial planar surface of said end ring shank portion 12 preferably ultimately abuts as the said shank portion is fully received in the sleeve open end 6. The rebating process also further defines an axial inner surface 16 in the sleeve open end, and as is shown in the Figure, screw thread formations 18 are ideally provided in the axially innermost region of said axial inner surface 16, and corresponding screw threads 20 are provided towards the free axial end of the shank portion 12 of the end ring on the outermost axial surface thereof. By such means, not only can the end ring 4 be received within the open end 6 of the tube 8, but it can be exceedingly firmly secured therein.

Although this specific description is only concerned with end rings which are screwingly secured within the open ends of their corresponding sleeves to create the sleeve assembly, the skilled reader should understand that the present invention need not be limited by the particular form and type of fixing by means of which the end ring is firmly secured to and within the sleeve. Indeed, the only requirement, as far as the present invention is concerned is that both sleeve and end ring have respective "fixing" surfaces, provided at similar axial depths from the respective annular end surfaces of both sleeve and end ring, and it is these surfaces which either mechanically interact with one another (in the case of screw threads and common interference fit connections), or are otherwise are, or become, secured to one another, for example if a high strength epoxy or other adhesive is to be used as the fixing means. Importantly, as far as the present invention is concerned, it is the interface between the respective cylindrical surfaces of sleeve and ring which is often prone to operative liquid ingress, and indeed the present invention has as one of its primary objects a means of limiting or possibly even precluding the ingress of operative liquid into this interface from externally of the sleeve assembly, as will be further described hereinafter.

As may also be seen in FIG. 1, the end ring 4 is provided with a peripheral flange 22 which effectively enlarges the outermost diameter of the end ring in its axially outermost region. In the illustrated embodiment, the radial dimension of said flange 22 is exactly the same as the radial dimension of the outermost radial annular surface 10 so that, once the end ring is fully received and screwed into the open end 6, said flange abuts said radial annular surface 10 in planar mating fashion and thus defines a barely visible seam therebetween. As will become apparent from the following description, however, alternate arrangements are possible.

In terms of the interior of the tube 8, as is common for sleeve assemblies of the type with which the present invention is concerned, multiple further layers are provided around the innermost axial cylindrical surface of the tube, and in the Figure, three such layers are referenced at 30, 32, 34. In order to render the sleeve assembly internally expandable to at least some degree, at least one such layer must be formed from a material which is relatively dimensionally much less stable than the aluminium (or steel) of which the sleeve itself is primarily constructed—it is this layer that renders the liner radially compressible to some degree, and is thus often terms the compressible layer.

Specifically, in most common known arrangements, the liner is constituted of three layers. The first, radially innermost layer 30, known as the base wrap layer, is commonly made from a fibreglass-type material, or in some cases, a glass (or other) fibre reinforced plastics or polymer material. To the cylindrical radially outer surface of layer 30 is then provided a compressible layer 32, which is most often of an open- or closed-cell foam, foam-like or sponge-like composition, such as, for example any polymer foam (e.g. polyurethane foam). To the radially outer surface thereof is provided further layer 34, commonly known as a composite build-up layer which is usually fibrous and absorbent. In the simplest liners, an inexpensive matting material such as coir mat is used, which is firstly dipped, submerged or otherwise impregnated with an epoxy resin which is largely absorbed into the matting layer which can then be wrapped around the exterior surface of the compressible layer, after the adhesive or epoxy with which it is impregnated is then cured. It is the radially exterior-most cylindrical surface of this layer which interfaces with the innermost axial surface of the tube 8. Most commonly, liner is adhesively bonded to the interior cylindrical surface of the tube 8. Liners such as described are prefabricated items with all their respective layers already bonded together, and may have an overall annular thickness of maybe only 8-25 mm, depending on application and the diameter of the tube inside which they are to be bonded. The typical thickness of layer 30, being always the thinnest layer, is no more than 2 mm, and often this layer may be as thin as 0.4-1.5 mm. In some applications, the layer may be only 50-400 microns thick. The compressible layer 32 may be 3-8 mm thick, with the outermost layer 34 being the thickest, at maybe 4-15 mm.

Figure 2:
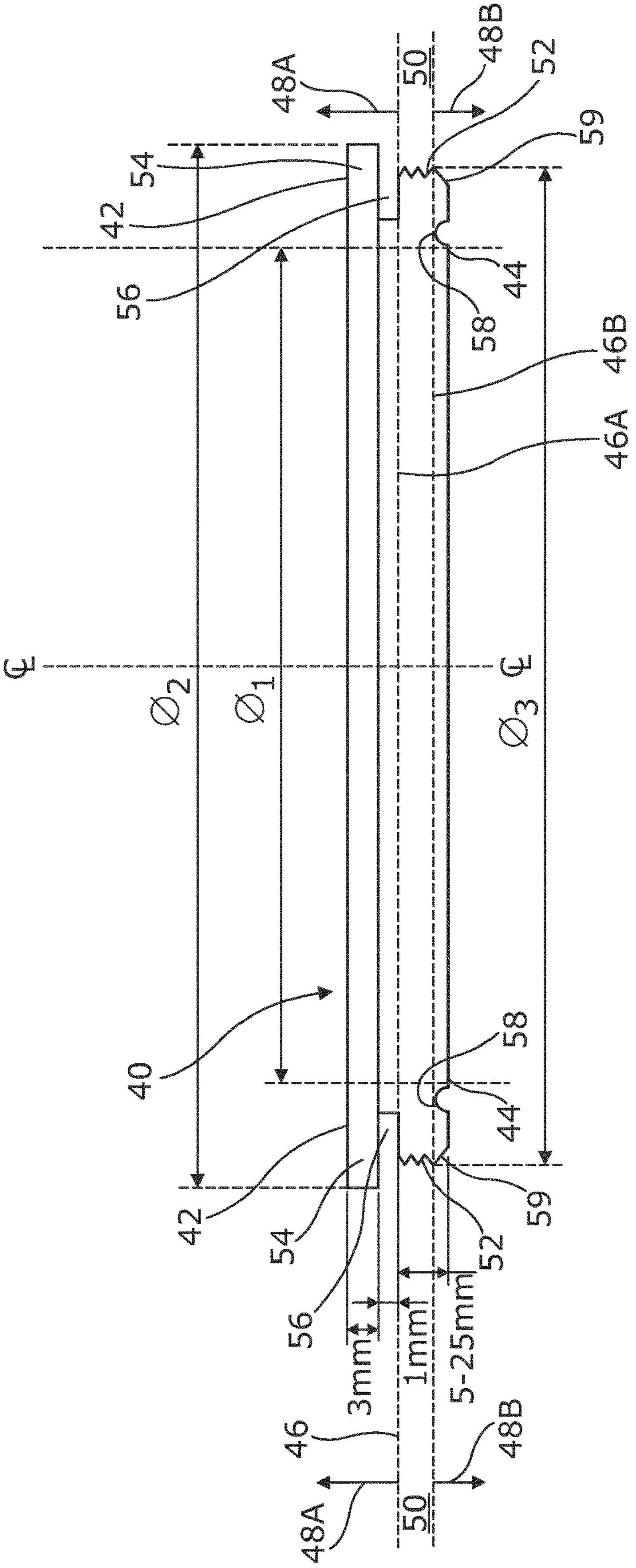
FIG. 2 shows a side elevation of an end ring according to one embodiment of the present invention.

Referring now to FIG. 2, there is shown a side elevation of a modified end ring, indicated generally at 40 according to one embodiment of the present invention. Although other views are not provided, the skilled reader will immediately understand that this end ring is essentially similar in shape and size to that illustrated in FIG. 1, in that the end ring is essentially an annular component with a uniform inner diameter $\varphi_1$, an outer diameter $\varphi_2$, with the average diameter of the threaded portion being $\varphi_3$, as shown in the Figure, such that the annular end surface 42 is of a thickness $(\varphi_2-\varphi_1)/2$, whereas the axially innermost (in use) generally annular end surface 44 is of a thickness $(\varphi_3-\varphi_1)/2$.

In the interests of brevity, all of FIGS. 2, 3, 4A, 4B, 4C, 5 and 6 illustrate an embodiment of the invention which includes all of: the "undercut", "groove" and "chamfer" embodiments of the invention. It should of course be understood that only one or two of these embodiments need necessarily be provided, or some combination thereof, but it is most preferred that at least the "chamfer" and "groove" embodiments be present.

For the sake of explanation and consistency of terminology, it is useful to notionally axially divide the end ring 40 along dotted lines 46A, 46B, such that the "first" axial portion 50 of the end ring is that portion which lies between these dotted lines, and the "second" portion of the end ring is that which lies outside them, indicated in this FIG. at 48A, 48B, with 48A being axially outermost and 48B being axially innermost. This language corresponds to that used herein in the statements of invention above and/or the claims of the application appearing hereinafter.

Thus the first portion 50, and in particular the exterior cylindrical surface thereof, in this embodiment at least, is provided with threads 52. The second portion 48A is provided with a radially projecting lip 54 which projects radially beyond the radial extent of the second portion 50 of the end ring (that is, $\varphi_2>\varphi_3$) and second portion 48B, in contrast is provided with a chamfer 59. As can be seen in the figure, the radially innermost portion (beneath this radially projecting lip) is provided with a continuous undercut channel 56, completely around the end ring behind lip 54. As can be seen in the Figure, the base (not referenced) of the undercut channel has a diameter dimension which is less than $\varphi_3$. Example axial thickness dimensions of 3 mm, 1 mm, and 5-25 mm for each of the axial thickness (or depth) of the radially projecting lip, the axial thickness (or width) of the undercut channel, and the axial thickness (or depth) of the threaded second portion respectively are also provided in the Figure. Example dimensions for ($\varphi_1$, $\varphi_2$ and $\varphi_3$ are provided elsewhere within this specification. All dimensions will of course depend fundamentally the nature of the machine and application in which the sleeve assembly of the present invention is to be used, and in most cases, the determining dimensions is (1) the required exterior diameter of the sleeve assembly as a whole, and (2) the overall axial length of the sleeve assembly, both these often being primarily determined by the length and diameter of the air or bridge mandrel onto and from which the sleeve assembly is to be mounted and dismounted.

The end ring 40 is, in the particular embodiment illustrated, provided with a continuous circular channel or groove 58, having a typical radius dimension of only a few mm, e.g. 1-5 mm, in the, in use, axially innermost annular end surface 44. The lateral positioning, that is the radial or diametral dimension of said groove or channel is important as will further be described below, but in most embodiments, the said groove or channel will be disposed radially outwardly of the innermost cylindrical surface of the end ring and spaced from said surface by only a few mm, this spacing typically being the same as, or slightly greater than, the thickness of the innermost fibreglass layer of the liner (see additional description below). In particular, the most preferred diametral dimension of the said groove or channel is such that the groove is disposed exactly radially above the compressible layer, or slightly radially outwardly offset therefrom, as can be seen in FIG. 3 and subsequent Figures.

Figure 3:
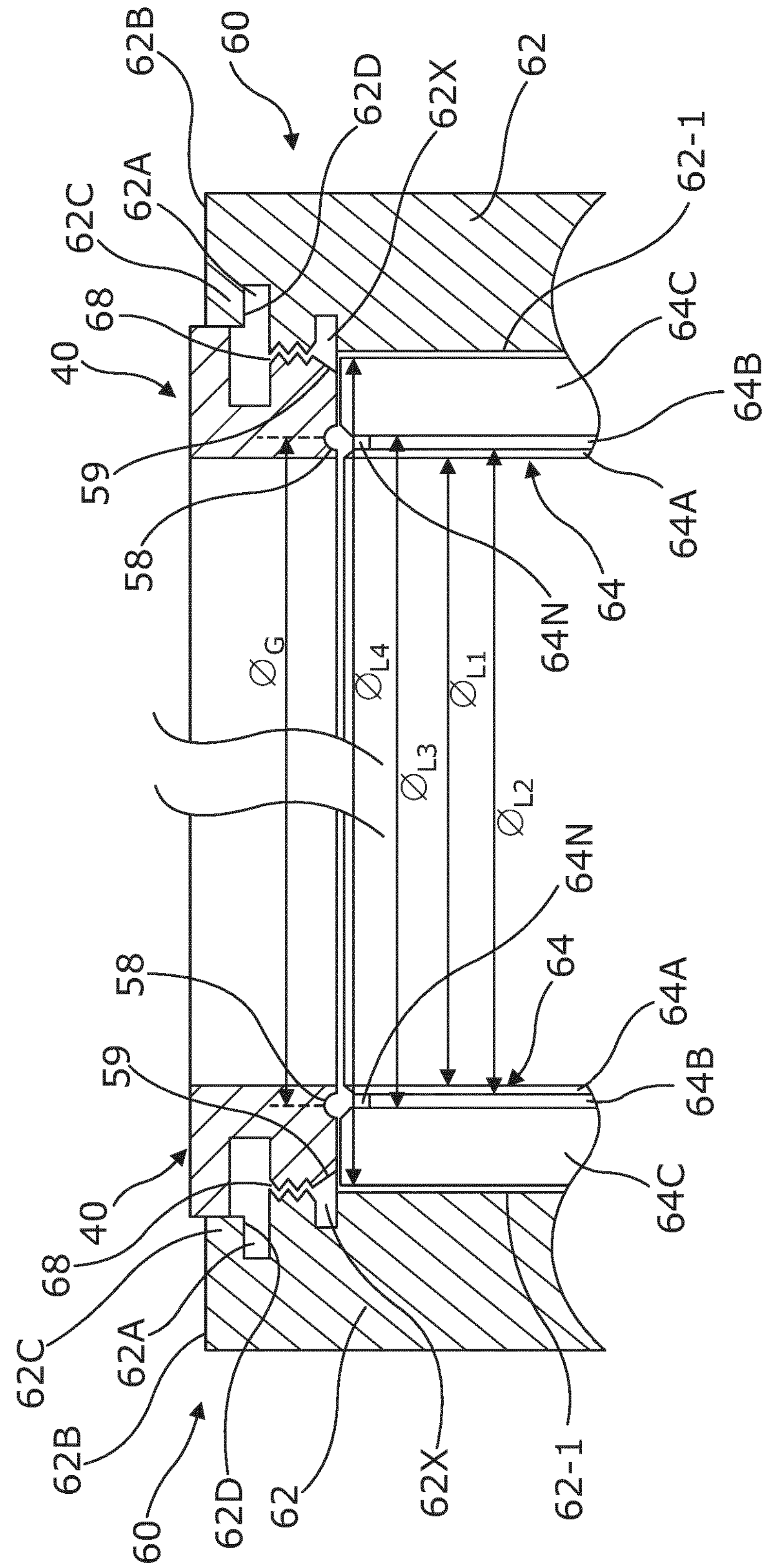
FIG. 3 shows a condensed sectional elevation of a sleeve assembly according to the invention, comprising the end ring of FIG. 2 fully and completely screwed into one end of a sleeve according one embodiment of the present invention.

In this FIG. 3, a sleeve assembly 60 according to the present invention is illustrated and referenced generally at 60, and comprises an annular sleeve 62, typically of Aluminium or Steel, but other metals, alloys or plastics composite materials may be considered, a multi-laminar liner indicated generally at 64 and typically adhesively bonded to the interior cylindrical surface 62-1 of the sleeve, as is well known. As the skilled reader will understand from the Figure, only one end of the entire sleeve assembly is illustrated, but in most embodiments, it can be presumed that the alternate end is of identical configuration. As previously discussed, liner 64 comprises at least three distinct layers, 64A, 64B, 64C, being, respectively, a fibre-glass base wrap layer, a cellular foam compressible layer, and a composite and/or fibrous build-up layer, all of increasing annular thickness. Finally, the sleeve assembly 60 includes an end ring 40, as described above with reference to FIG. 2, fully and completely screwed into the illustrated end of the sleeve 62, and occupying its final axial position therein.

In the position illustrated, it is important to understand certain dimensional and positional aspects of the end ring, relative to other components of the sleeve assembly. Firstly, as can be seen from the Figure, the diametral dimensions of the layers 64A, 64B, 64C of the liner 64 are referenced at $\varphi_{L1}$, $\varphi_{L2}$, $\Phi_{L3}$ and $\varphi_{L4}$ respectively, and in order for any radial compression of the liner to occur at all, the interior cylindrical surface of the liner 64, and thus layer 64A, must lie within the adjacent cylindrical surface of the end ring, that is it is essential that $\varphi_{L1}<\varphi_1$, typically by a tiny amount, e.g. 0.2-1 mm, and most commonly about 0.7 mm. Secondly, in this embodiment, it can be seen that the groove or channel lies entirely radially beyond the innermost diametral dimension of the compressible layer 64B of the liner, that is the diametral dimension $\varphi_G$ of the groove, less the radius dimension of the groove itself (not illustrated, but herein $r_G$) are such that the following relation holds:

$$\varphi_{L2} < (\varphi_G - 2r_G) < \varphi_{L3}$$

(or in some embodiments, $\varphi_{L2}\leq(\varphi_{L2}-2r_G)\leq\Phi_{L3}$)

In other words, the groove or channel must radially overlap at least some portion of the compressible layer (and specifically the continuous channel provided therein, as further explained below) of the liner, by at least some extent.

Indeed, the most preferred arrangement is defined by the following relations:

$$(\varphi_G + 2r_G) = \varphi_{L3} \text{ and } (\varphi_G - 2r_G) = \varphi_{L2}$$

(i.e. the groove or channel exactly overlies the compressible layer of the liner, or the continuous channel provided therein/excavated therefrom).

In certain preferred embodiments of the invention, in particular those where a further continuous channel or groove which is unmatched with a corresponding channel in the annular end surface of the liner, then one or more other relationships might apply, for example:

(1) $(\varphi_G\text{-}2r_G)>\varphi_{L3}$ (the radially innermost edge of the groove lies radially to the outside of the outermost diametral dimension of the compressible layer 64B of the liner 64)

(2) $(\varphi_G\text{-}2r_G)=\varphi_{L3}$ (the radially innermost edge of the groove lies radially coincident with the outermost diametral dimension of the compressible layer 64B of the liner 64)

(3) $(\varphi_G=2r_G)>\varphi_{L3}$ (at least some portion of the groove lies radially beyond the outermost diametral dimension of the compressible layer 64B of the liner 64)

(4) $\varphi_G=\varphi_{L3}$ (the diametral dimension of the groove is the same as that of the radially outermost surface of the compressible layer 64B so that the groove lies symmetrically above the interface between the 64B and composition/fibrous build-up layer 64C)

Figure 5:
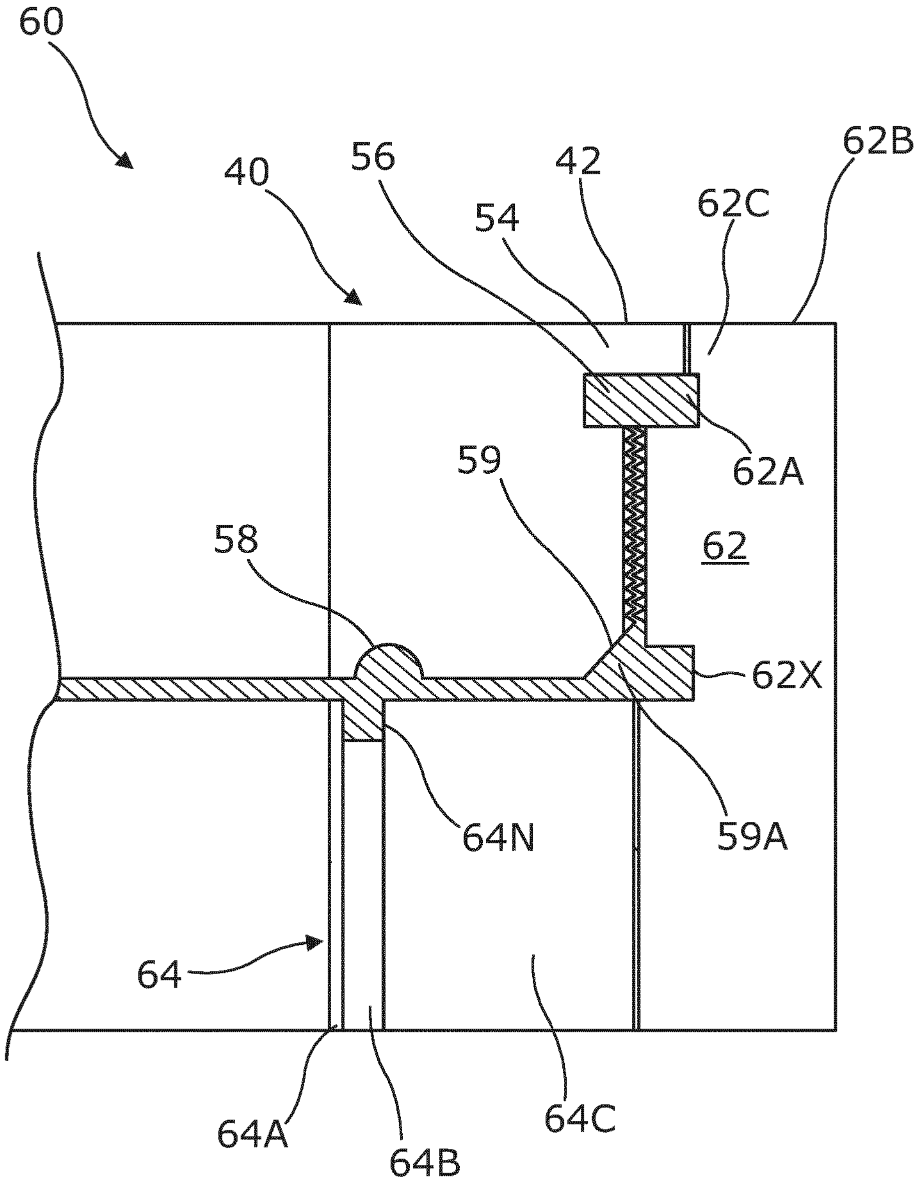
FIGS. 5, 6 shows an enlarged partial sectional elevation of a sleeve assembly according to embodiments of the present invention, both Figures in particular showing one end of a completed sleeve assembly, and different possible configurations of the "groove" embodiment of the invention.

(5) $(\varphi_G+2r_G)<=\varphi_3$ (the radially outermost edge of the groove lies radially to the inside, or adjacent the threaded portion of the end ring), or $(\varphi_G+2r_G)>\varphi_3>(\varphi_G\text{-}2r_G)$ (the radially innermost edge of the groove lies radially to the inside the threaded end portion of the end ring; in this case, the groove would be more akin to a radially inward chamfer between the threaded portion of the end ring, thus reducing the axial length of the threaded portion, and the annular end surface of the end ring; indeed, as shown in FIG. 5, this chamfer be employed together with a groove as above defined and described, to provide additionally sealing robustness).

In all cases, however, the groove must lie within the annular end surface 44 of the end ring, so $(\varphi_G\text{-}2r_G)>\varphi_1$ will generally always apply. A typical dimension for re may be of 2-4 mm, but this will of course depend on the relative annular thicknesses of the layers within the liner, and the radial extent of chamfer 59, which may be order of 1-6 mm.

The radial position of the groove is important and principally arises from its desired function, namely, when filled with gasket forming composition which subsequently cures to form a sealing gasket, such curing also unites the gasket forming composition present within the groove with the gasket or cured or uncured gasket forming composition already present within a corresponding or "matched" continuous channel provided in the annular end surface of the liner, referenced in FIG. 3 at 64N, at least to some extent. When provided, said channel 64N is most preferably between about 5-8 mm in depth, and is both completely dry and clean from any debris, dust, or other particulate matter or detritus which remain therein after the milling, routing or boring tool has completed excavating said channel, as clean dry surfaces aid the bonding efficacy of the curable elastomeric compound deposited with said channel to the base and sides thereof. Furthermore, it is particularly preferable that the channel is excavated in the membrane, and optionally also some radially proximate part of the exteriorly disposed outer buildup (coir mat) layer of the liner, to a substantially or precisely uniform depth from the annular end surface of the liner, and that this channel is then completely filled with the curable polymeric and/or elastomeric composition.

Thus, firstly, as the end ring is screwed into the end of the sleeve, the gasket forming composition present in the groove comes into contact with, and indeed is smeared all over and around the gasket or gasket forming composition present within the matched continuous channel of the liner so as to create a quasi-unitary axially extending seal structure, albeit one which has not yet solidified. Once the end ring is fully screwed in place, and the sleeve assembly left undisturbed, the gasket forming composition cures and in doing so become essentially united with the gasket or gasket forming composition present in the matched continuous channel of the liner, and thus a band or ribbon of gasket is created which extends axially towards the end surface of the sleeve assembly from the base of channel 62N and into the roof of groove 58, and in substantially cylindrically continuous fashion. This axially disposed barrier seal thus completely prevents fluid from travelling radially past it, from either direction, as is better illustrated in FIGS. 4A, B, C.

Of course, and as will be described further below with reference to said FIGS. 4A, B, C, the corresponding threaded portions of both end ring and sleeve will normally have some sealant or gasket forming composition applied thereto so that when the former is screwed into the latter, the sealant is smeared substantially around, into and within the threads and upon curing, creates a substantially complete seal. However, the perfection of this seal can not be guaranteed, and in any event the amount of sealing composition which exists between the screw threads is so miniscule that it can easily disintegrate, either physically as a result of the high speed rotation and vibrations to which the sleeve is subjected during use, or chemically as a result of the chemical reaction with or dissolution in any operative liquid which manages to make its way through to the screw thread interface region between end ring and sleeve.

As can also be seen in FIG. 3, a further feature of sleeve 62 is a continuous undercut channel 62A which, in similar fashion to the undercut channel 56 of the end ring (to which it is, in the language of this specification axially "matched"), is routed out from the interior cylindrical surface of the sleeve at an axial depth beneath an annular end surface 62B of the sleeve which is similar to the axial depth of undercut channel 56 beneath the annular end surface 42 of the end ring 40. The effect of this undercut channel 62A is to define, axially above it, a radially inwardly projecting lip 62C on the sleeve. By this arrangement, and as illustrated in FIG. 3, when the end ring is completely and fully screwed into an open end of the sleeve, the undercut channels 56, 62A of both end ring and sleeve are substantially axially aligned, or at least axially overlap to at least some degree, such that a sealing gasket or gasket forming composition (not illustrated in FIG. 3 but shown and described in greater detail below with reference to FIGS. 4A, B, C) provided in one or both undercut channel can effectively sealingly bridge across the circular opening 68 to the interface between screw threaded portions of end ring and sleeve axially below said opening. As such, this radially extending sealing bridge or barrier provides a very effective means of preventing or at least substantially limiting, operative liquid ingress axially beyond said bridging or barrier seal.

Finally in FIG. 3, a further feature of sleeve 62 is a continuous channel 62X which is broadly similar to continuous undercut channel 62A above, except of course that it is disposed axially more deeply within the sleeve so as to be substantially if not exactly axially matched with chamfer 59. Thus as illustrated in FIG. 3, when the end ring is completely and fully screwed into an open end of the sleeve, the undercut chamfer 59, and continuous channel 62X of end ring and sleeve respectively are substantially axially aligned, or at least axially overlap to at least some degree, such that a sealing gasket or gasket forming composition (not illustrated in FIG. 3 but shown and described in greater detail below with reference to FIGS. 4A, B, C) provided both over the chamfer 59 of the end ring and in continuous channel 62X can effectively sealingly bridge across the seam between the most exterior cylindrical surface of the liner and the adjacent cylindrical surface 62 of the sleeve. As such, this radially extending sealing bridge or barrier provides a very effective means of preventing or at least substantially limiting, operative liquid ingress axially beyond said bridging or barrier seal into said seam.

Figure 4A:
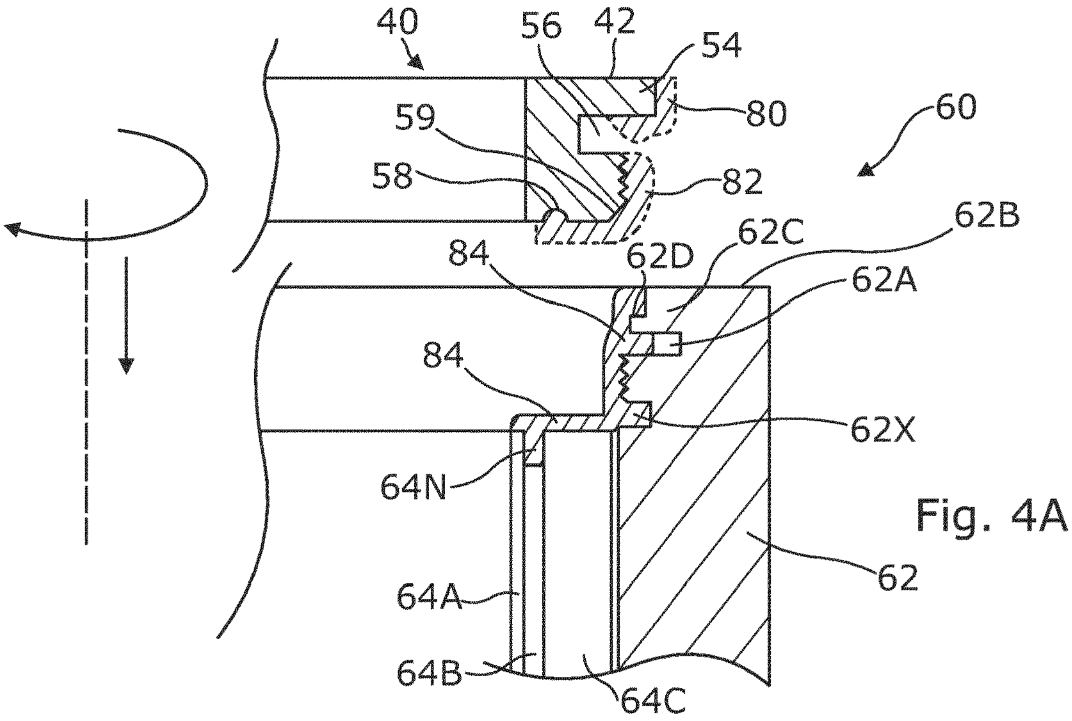
FIGS. 4A, 4B, and 4C show various partial sectional elevations the end ring of FIG. 2 and a sleeve according to one embodiment of the present invention at different stages of insertion of the end ring into an end of the sleeve and securing therein.
Figure 4B:
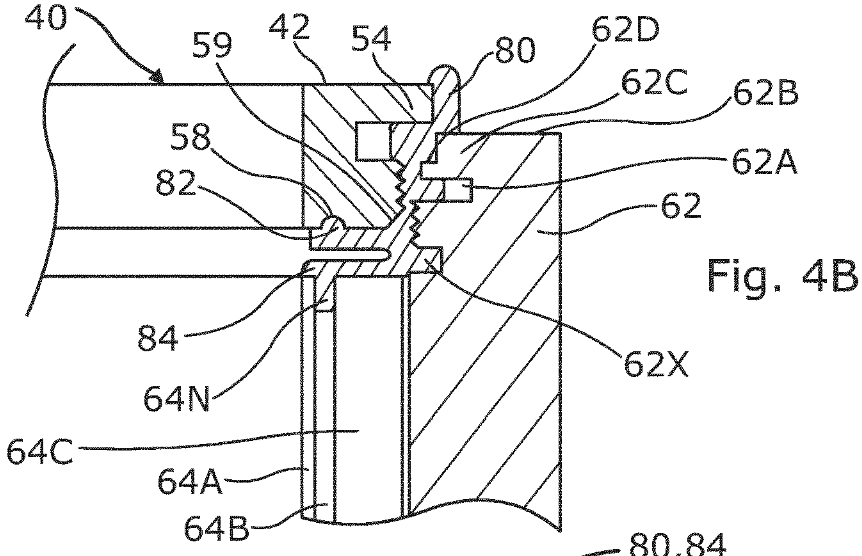
Figure 4C:
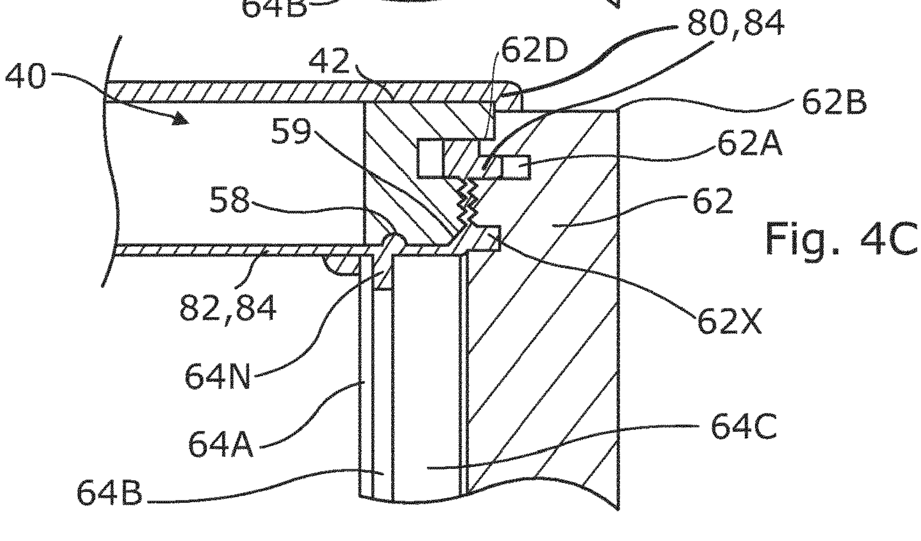

Referring now to FIGS. 4A, 4B, 4C, in which the reference numerals used in FIG. 3 are also used to reference similar components, features and parts thereof, prior to screwing (or other, e.g. interference fit) insertion of end ring 40 into and within an open end of sleeve 62, in this particular embodiment, amounts of initially fluent but ultimately curable gasket forming composition 80, 82, 84 are applied, manually or mechanically, to the exposed cylindrical surfaces of both end ring and sleeve, such being disposed to the exterior of the end ring and to the interior for the sleeve. In FIG. 4A, amounts 80, 82 are shown separate, but of course they may be applied such that they form a single axially and circumferentially continuous amount of composition. Furthermore, although undercut channel 56 is shown, in this embodiment at least, without any significant amount of composition present therein, this may not be the case, and the undercut channel 56 may of course be completely or partially filled with composition. Indeed, in most preferred embodiments, both undercut channel 56 and groove 58 are specifically and substantially filled with curable gasket forming composition. In some embodiments, the fluent gasket forming composition is applied to only one or other of the end ring and the sleeve, but whatever the application methodology, the aim of such is to ensure robust seals as follows:

(1) within annular space defined by respectively aligned or matched undercut channels 56, 62A of end ring and sleeve respectively when the former is fully and completely screwed into the latter, such seal bridging across the opening 68 (see FIG. 3)

(2) within annular space defined by respectively aligned or matched chamfer 59 and continuous channel 62X of end ring and sleeve respectively when the former is fully and completely screwed into the latter, such seal bridging across the circular join seam between the exterior cylindrical surface of the liner and the corresponding adjacent inner cylindrical surface of the sleeve to which it is adhered (see FIG. 3)

(3) within the continuous groove or channel 58 and within corresponding substantially radially aligned matched continuous channel 64N provided in the liner, such that both are essentially filled, (4) against the adjacent and proximate annular end surface of the liner, including at least some annular end surface portion of the composite and/or fibrous build-up material layer of the liner, (5) Between the axially innermost annular end surface of the end ring and whatever portion of the annular end surface of the proximate and adjacent liner is radially covered by that end ring annular end surface (as described above, not all the liner annular end surface is completely radially covered)

(6) Between and within the respective threaded portions of end ring and sleeve, (7) Between all other circumferentially proximately, and adjacently disposed cylindrical surfaces of end ring and sleeve, and (8) Between any and all other radially extending surfaces of end ring and sleeve which are disposed proximate one another or abut one another when the end ring is fully and completely screwingly completely inserted within the end ring.

Thus, in the embodiment illustrated in FIG. 4A, sufficient gasket composition is shown as having been applied to achieve all the above aims, though for the purposes of the present invention, only one or more of aims (1), (2), (3) above are considered as being essential.

It is worth mentioning here also that in some preferred embodiments, only initially fluent curable composition is used from the outset, and the end ring(s) are screwed into the ends of the sleeve when all of the gasket forming composition used has not yet cured, and is still in an essentially fluent or fluid state.

Referring now to FIG. 4B, end ring 40 is shown in a stage of partial insertion into the open end of the sleeve 62. As can be seen, and as the skilled reader will understand, the insertion procedure causes deformation and coalescence of the various amounts 80, 82, 84 of fluent curable gasket forming composition, such effectively uniting and becoming one continuous mass. Naturally, some of the gasket forming composition will flow and be squeezed into, between and from the various respective surfaces, channels and grooves of one or both of the end ring and the sleeve. For instance, amounts 80, 84 will coalesce to some degree, and any surfeit of composition will be squeezed from between the radially outwardly projecting lip 54 of the end ring 40, and the proximally and adjacently disposed radially inwardly projecting lip 62C of the sleeve, ultimately forming a circular bead of composition immediately the interstice formed betwixt the two. Similarly, amounts of fluent gasket forming composition 82, 84 will ultimately coalesce between the axially innermost annular end surface of the end ring and the annular end surface of the liner, with any surfeit of composition being squeezed radially inwardly from the interstice ultimately defined between these two surfaces, thus creating a similar circular bead of composition around the inside of the sleeve assembly in the region of said interstice.

The result in the completed sleeve assembly is shown in FIG. 4C, in which the now coalesced amounts of fluent gasket forming composition referenced at 80/84 and 82/84 can clearly be seen. Naturally, where a fluent gasket forming composition is used, it is normal practice to wipe away any beads of excess composition which form as a result of the connection of the end ring within the sleeve immediately thereafter, and before the gasket forming composition is allowed to cure.

Certain additional aspects of the present invention are illustrated in FIGS. 4A, B, C. Firstly, it is to be noted that the radially inwardly projecting lip 62C of sleeve 62 is dimensioned so that its innermost cylindrical or axial surface has a minimum inner diameter which is greater than that of the minimum inner diameter of the threaded portion of the sleeve, such that some portion, e.g. 0.5-2 mm, of the axially innermost sidewall which defines the undercut channel 62A projections radially inwardly beyond the radially inwardly projecting lip. This allows or at least promotes any amount 84 of fluent gasket forming composition applied into and within undercut channel 62A to be axially "visible" to the approaching end ring, and thus firstly permits or promotes coalescence with any amount 80, 82 applied to the end ring, whereafter further axial travel of the end ring causes the coalesced amount of fluent composition to be plastically deformed or otherwise forced further into said undercut channel by the relative axial movement between end ring and sleeve as the former is inserted into and secured within the latter. Similarly, amounts of fluent composition on the end ring, and in particular in or within the undercut channel 56 thereof, would be similarly deformed or otherwise forced deeper into that undercut channel. The result of these interactions is to ensure that a coalesced mass of fluent composition is created within both undercut channels of end ring and sleeve respectively, said coalesced mass extending from the undercut channel of the end ring across and into the undercut channel of the sleeve, and thus across and over the circular opening to the threaded interface region axially beneath said undercut channels, and so providing an effectively seal therefor and thereover.

A further feature of the present invention, provided in some embodiments, and illustrated in FIGS. 3, 4A, 4B, 4C, is the radially outward rebating of radially inwardly projecting lip 62C of the sleeve 62 to a depth less than the axial depth of the lip itself so as to define an abutment annular shoulder 62D against which a radially outermost portion of the underside of the radially outwardly projecting lip 54 of the end ring comes into contact with and abuts against when the end ring is being screwed into the sleeve. As the skilled reader will immediately understand, this shoulder 62D effectively limits the extent of axial travel of the end ring relative to the sleeve, and determines the final relative axial position of the former relative to the latter. As can also be seen in FIGS. 3, 4C, when the end ring is fully and completely inserted and secured within the sleeve, the annular end surface 42 of the end ring 40 stands slightly axially proud and above the adjacent annular end surface 62B of the sleeve 62. In practically all circumstances, this proud-standing amount is subsequently machined off, for example by grinding, so that the resulting annular end surface of the end ring lies precisely flush with the annular end surface 62B of the sleeve, and the overall length of the sleeve assembly as whole can be exceedingly precisely defined.

Figure 6:
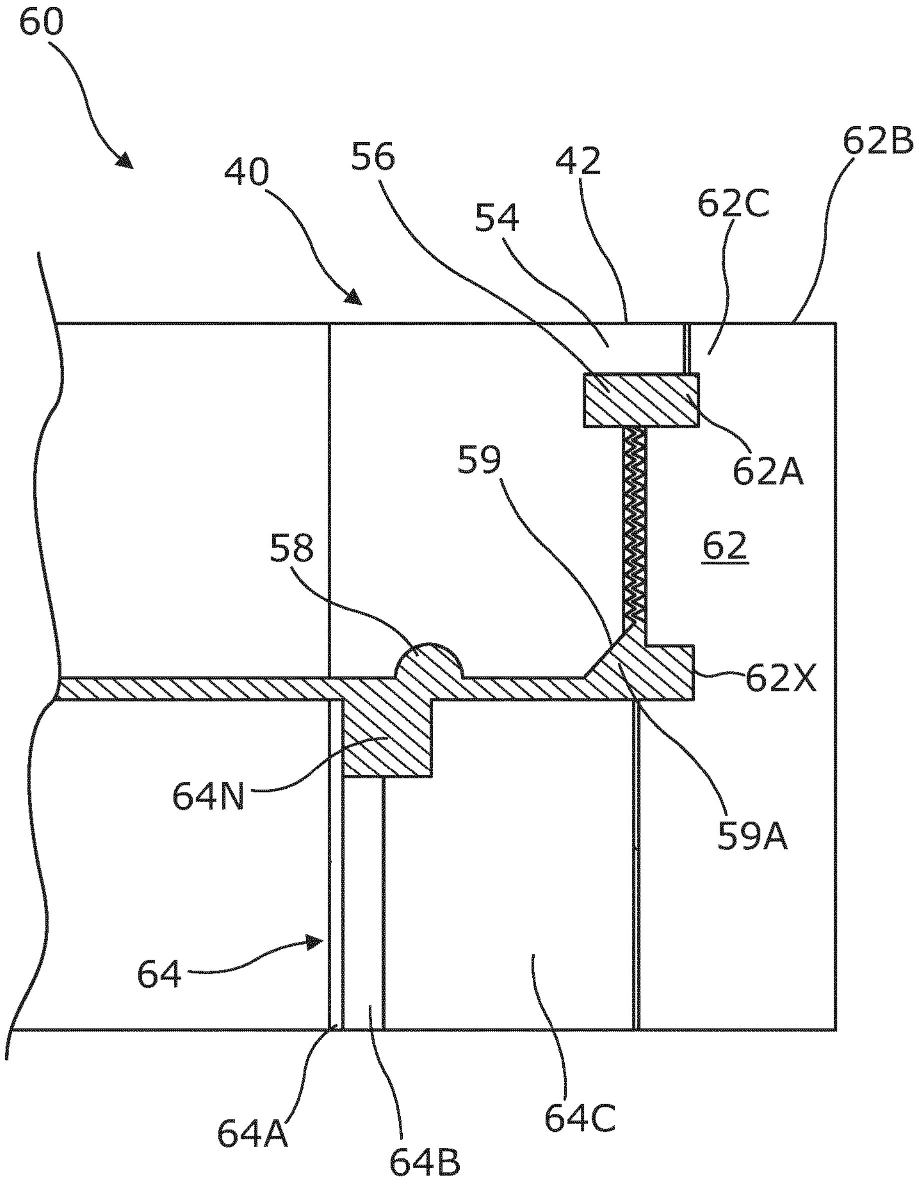

Referring finally to FIGS. 5, 6, an enlarged portion of a sleeve assembly 60 is shown in which the various salient features of the invention already described above can be more clearly seen. In particular, the relative dimensions and axial dispositions of chamfer surface 59 provided on the end ring and the corresponding continuous channel 62X provided in the sleeve can be seen, at least in the specific one embodiment illustrated (other dimensional and relative axial dispositions may of course be possible). Thus, the chamfer 59, together with corresponding continuous channel 62X, have the combined effect of creating an additional radially extending region 59A which may be occupied by a gasket or gasket forming composition, which may thus provide additional sealing benefits, particularly as regards any operative liquid which has managed to penetrate seals disposed axially above and earlier in the potential axial fluid ingress pathway. In particular, once the initially fluent gasket composition provided over the chamfer 59 and within the corresponding continuous channel 62X cures, this creates, in effect, an annular, radially extending barrier seal which directly resists fluid ingress into the circular join seam between the liner and the sleeve which lies immediately beneath it. Furthermore, applicant believes that the existence of this particular annular barrier seal further inhibits fluid ingress, beyond said annular barrier seal, radially inwardly and towards the compressible layer of the liner. In FIG. 5, 6, it is to be noted that the axial depth and position of the channel 62X is such that (a) it's axially deepest edge lies flush with the annular end surface of the liner, and (b) the axial overall depth of the channel is such that its axially shallower upper edge lies substantially axially coincident with the axially shallowest edge of chamfer 59. Of course, other arrangements are possible: for example, the channel 62X may be have an axial disposition and depth such that (a) it's axially deepest edge lies flush with the axially deepest edge of the chamfer 59 of the end ring, and (b) the axial overall depth of the channel is such that its axially shallower upper edge lies substantially axially coincident with the axially shallowest edge of chamfer 59. The skilled person will of course realise many other possible configurations all of which lie within the scope of the present invention, provided that, axially, the said chamfer 59 and said channel 62X overlap at least to some degree.

Additionally, FIGS. 5, 6, different possible configurations and arrangements of the groove 58 and matched continuous channel 64N are illustrated. Specifically, in FIG. 5, both groove 58 and channel 64N or relatively smaller, with the groove being disposed marginally radially outwardly of the channel 64N, but largely overlapping it. In FIG. 6, both groove 58 and channel 64N are relatively larger, and although the relative radial disposition of both is similar, it is to be noted that the channel 64N provided in the end surface of the liner 64 is formed by excavating both the compressible layer and a portion of the coir mat build-up layer. In some embodiments, this is a preferred configuration as it effectively radially outwardly displaces the radially outermost surface of the barrier seal as a whole, which effectively renders it even more difficult for an fluid migrating radially inwardly along the interstice between the end ring and the liner in the direction of the compressible layer because such fluid now encounters the barrier seal earlier in its travel, and at a position which is effectively more remote from the compressible layer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A sleeve assembly comprising a pair of annular end rings and an annular sleeve in each end of which said end rings are substantially disposed, said sleeve being provided internally with an annular radially compressible liner substantially symmetrically disposed within said sleeve between the end rings and being of a length such that the annular end surfaces of said liner are disposed proximate and adjacent the innermost annular end surfaces of said end rings, said liner being adhered or otherwise affixed to the interior cylindrical surface of the sleeve around its outer cylindrical surface, each of said end rings having both an exterior generally cylindrical surface which extends axially and is, in use, disposed adjacent a corresponding interior generally cylindrical, axially extending surface of said sleeve, and an inner annular end surface which extends radially and is, in use, disposed adjacent a corresponding annular and radially extending end surface of said liner, said outer cylindrical surfaces of said end rings, in first portions thereof, being provided with or functioning as connection means which interact with corresponding portions of the cylindrical surfaces of the sleeve and whereby said end rings are secured to and substantially within said sleeve at either end thereof, second portions of said outer cylindrical surfaces of said end rings being those portions thereof axially outwith the first portions, wherein:

At least one of said end rings is provided with at least one continuous excavation formation in at least one of:

the second portion of the outer cylindrical surface of said end ring, in which case said continuous excavation formation depends radially inwardly of the end ring, and said inner annular end surface of said end ring, in which case said excavation formation depends axially within said end ring away from said inner annular end surface thereof, And a corresponding continuous channel is provided in at least one of:

The corresponding cylindrical surface of the sleeve adjacent which the outer cylindrical surface of the end ring is, in use, disposed, and The corresponding annular end surface of the liner adjacent which, in use, the inner annular end surface of the end ring is disposed, The respective axial and/or radial dispositions of said end ring excavation formation and the corresponding continuous channel provided in one or both of the sleeve or the liner being such that, when the end ring is fully inserted within and secured to the sleeve, said at least one excavation formation of the end ring and said corresponding continuous channel of the sleeve and/or liner axially and/or at least partially radially overlap whereby an amount of an initially fluent curable gasket forming composition deposited substantially within or over said at least one end ring excavation formation can unite with a corresponding gasket or amount of gasket forming composition disposed in said corresponding continuous channel provided in the sleeve or the liner so as to form, once the initially fluent curable gasket forming composition cures, one or both of:

A continuous annular barrier seal which extends radially across the interstice defined between adjacent corresponding cylindrical surfaces of end ring and sleeve, and A continuous rib barrier seal which extends axially across the interstice defined between adjacent corresponding annular end surfaces of end ring and liner.

2. An assembly according to claim 1, wherein one or both end rings are provided with an excavation formation in the form of a continuous undercut channel in the second portion of their outer cylindrical surfaces, and the sleeve is provided with corresponding continuous undercut channels at either end, internally thereof, in the corresponding cylindrical surfaces of said sleeve.

3. An assembly according to claim 1, wherein a radially innermost portion of the annular end surface of the sleeve is rebated radially outwardly towards the exterior cylindrical surface of the sleeve such that an annular shoulder is defined within the annular end surface of the sleeve, said annular shoulder providing a contact surface which supports, and against which abuts, a corresponding peripheral annular surface of an underside of a radially outwardly projecting lip of the end ring upon full and complete insertion of said end ring into an end of the sleeve, said annular shoulder providing a means whereby the axial travel of said end ring into and within an end of the sleeve is restricted.

4. An assembly according to claim 1, wherein the inner diameter of the end ring is preferably greater than the inner diameter of the liner by an amount in the range of 0.1-1% of the total inner diameter dimension of the end ring.

5. An assembly according to claim 1, wherein the gasket forming composition is initially a viscous but fluent liquid which subsequently cures into a rubberised, elastic waterproof and chemically resistant elastomer.

6. An assembly according to claim 1, wherein, prior to insertion and mechanical connection of any end ring within a sleeve end, an amount of gasket forming composition is applied completely over any and all those exterior and interior surfaces, respectively, of one or both of the end ring and the sleeve which ultimately come into contact with one another, or become proximately and adjacently disposed with one another as a result of the insertion into and mechanical connection of the end ring within an and of the sleeve.

7. An assembly according to claim 1, wherein the excavation formation takes the form of a continuous chamfer which is provided around an end ring between, firstly, the axially innermost annular end surface thereof, and secondly, an axially innermost portion of the axially extending cylindrical surface thereof, and the sleeve is provided with a corresponding continuous channel at a suitable axial position inside the sleeve so that when said end right is screwed fully and completely into an end of the sleeve, the chamfer on the end ring and continuous channel within the sleeve are to some extent axially coincident with one another inside the sleeve assembly as a whole.

8. An assembly according to claim 1, wherein the excavation formation provided on the end ring is one of: a channel, a groove, depression, notch and a chamfer and the gasket forming composition is applied thereto in such a manner that some amount of the applied gasket forming composition becomes therewithin.

9. An assembly according to claim 8, wherein the gasket forming composition is applied at least to the excavation formation in such a manner that it both partially or completely fills the excavation formation with some excess amount of said gasket forming composition overtopping said excavation formation.

10. An assembly according to claim 1, wherein the first portion of the outer cylindrical surface of both end rings is provided with threads, and the corresponding interior cylindrical surfaces of the sleeve, at either end thereof, are correspondingly tapped such that the end rings may be screwed into the sleeve ends and secured therein.

11. An assembly according to claim 10, wherein the extent of axial travel of the end ring within the sleeve as it is rotated during screwing connection of the former to and within the latter is mechanically limited by respective surfaces of end ring and sleeve coming into abutting contact with one another, whereby the innermost annular end surface of the end ring is automatically disposed proximate and adjacent an annular end surface of the liner adhered within the sleeve, but separated therefrom by an axial distance being one of: less than 3 mm, between 1.5 mm and 3 mm, and between 0.2 mm and 1.5 mm.

12. An assembly according to claim 1, wherein one or both of the second portion of the exterior cylindrical surface of the end ring, and the interior annular end surface of the end ring may be provided with a further excavation formation, axially distinct and separated from any other excavation formation provided in such surface, said further excavation formation not having any dispositionally matched further continuous channel provided in the corresponding adjacent surfaces of sleeve or liner.

13. An assembly according to claim 12, wherein the radial position of a first matched excavation formation and the dimension of the opening thereof are selected such that radially, a compressible layer of the liner and the continuous channel provided substantially within it is disposed entirely and completely radially inwardly of the further excavation formation, which is thus more radially distant from a central axis of the sleeve assembly than said compressible layer.

14. An assembly according to claim 1, wherein the excavation formation takes the form of a continuous groove which is provided in and around the innermost annular end surface of at least one end ring, and the liner is provided with a corresponding continuous channel excavated from at least one annular end surface thereof.

15. An assembly according to claim 14, wherein the liner component provided within the sleeve is a multi-laminar liner wherein at least one of the lamina is a compressible layer, and the continuous channel provided in the liner is created by substantially excavating said compressible layer to a uniform depth.

* * * * *